United States Patent [19]

Bich

[11] 4,321,988
[45] Mar. 30, 1982

[54] FIXING DEVICE FOR TELESCOPIC SHOCK-ABSORBER

[75] Inventor: René Bich, Maisons-Laffitte, France

[73] Assignee: Societe J.G. Allinquant, Gentilly, France

[21] Appl. No.: 79,937

[22] Filed: Sep. 28, 1979

[30] Foreign Application Priority Data

Sep. 28, 1978 [FR] France .................................. 78 27790

[51] Int. Cl.³ .............................................. F16F 9/54
[52] U.S. Cl. ................................ 188/322.11; 280/668
[58] Field of Search .............. 188/322, 322.11, 322.19; 267/179; 280/668; 403/357, 360, 365, 366, 372, 375, 377, 381

[56] References Cited

U.S. PATENT DOCUMENTS

| 1,041,286 | 10/1912 | Hoskins | 403/366 X |
| 2,385,635 | 9/1945 | Maurer | 188/322 |
| 3,917,308 | 11/1975 | Schulz | 280/668 X |
| 4,111,575 | 9/1978 | Hoshino | 403/377 X |

Primary Examiner—Duane A. Reger
Attorney, Agent, or Firm—Staas & Halsey

[57] ABSTRACT

A tube of a shock-absorber is mounted inside an iron ferrule formed with apertures in which are inserted projections as previously formed on the tube. The ferrule is formed integrally with tabs or legs for securing to a vehicle part such as a wheel axle.

2 Claims, 4 Drawing Figures

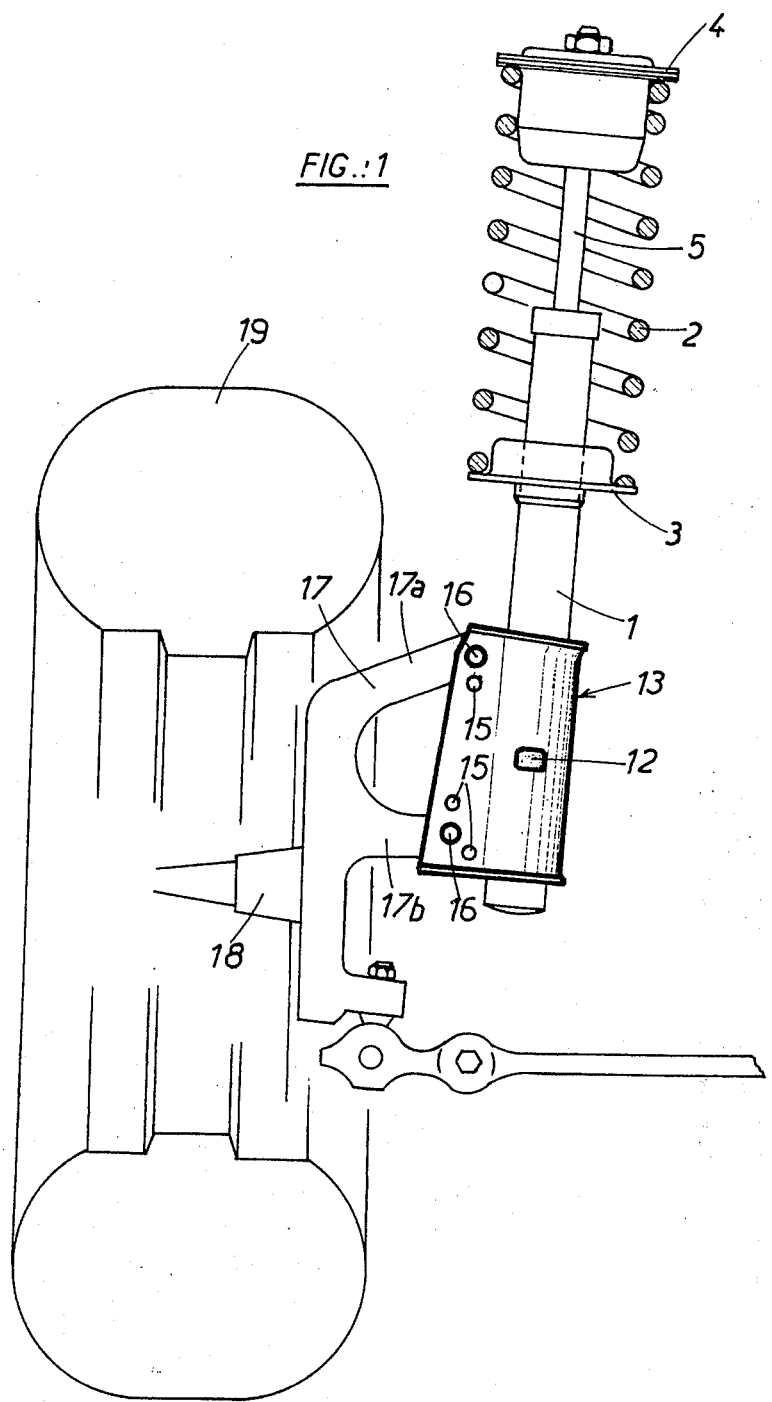
FIG.:1

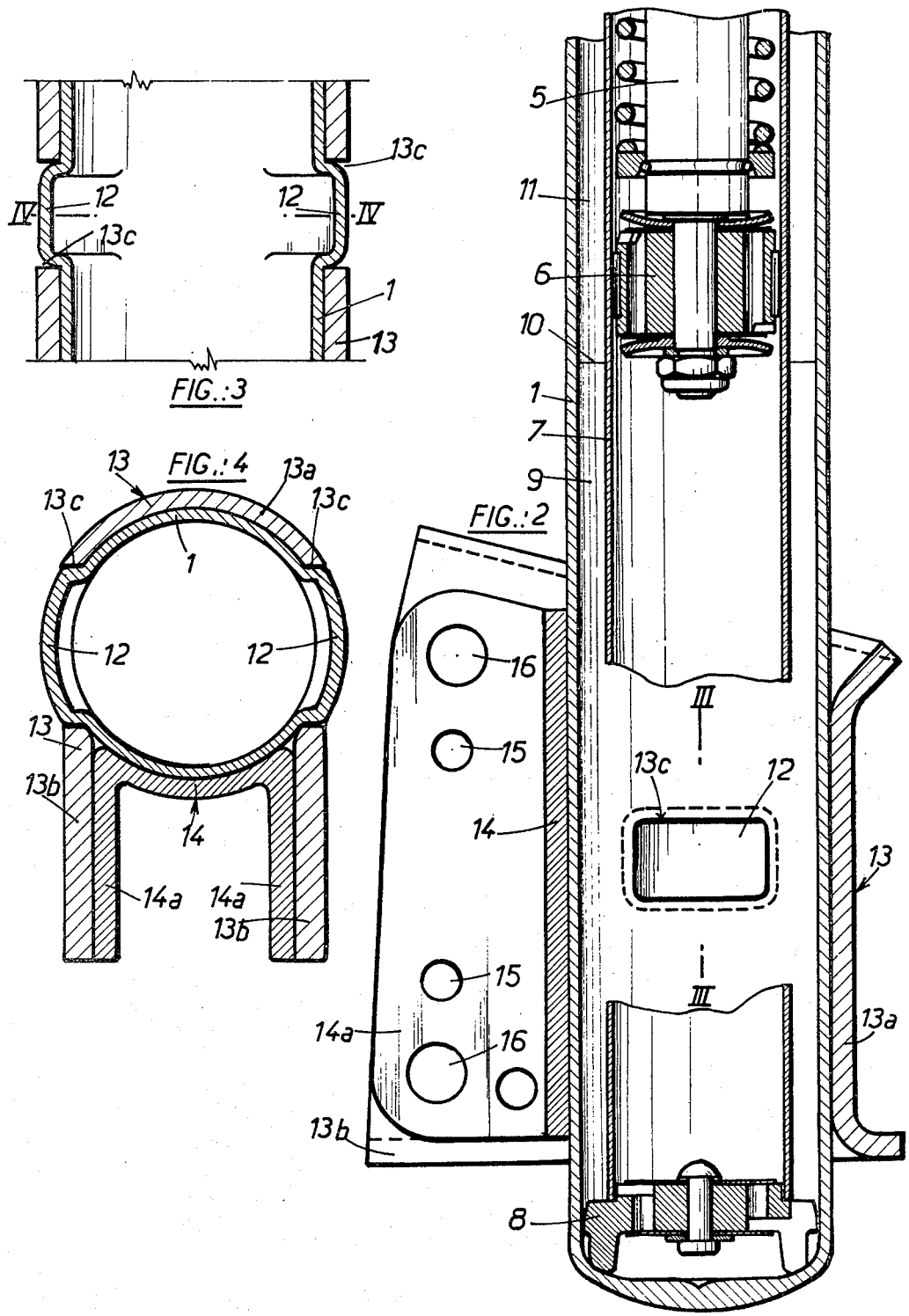

FIXING DEVICE FOR TELESCOPIC SHOCK-ABSORBER

BACKGROUND OF THE INVENTION

The present invention relates to an attachment device for a telescopic shock-absorber, which can be used particularly with an helicoidal compression spring, more especially the springing known as Mac-Pherson springings.

Hydraulic shock-absorbers, of the telescopic type, including a steel cylinder are well known, one end of which is closed, and the piston holding stem passing through an aperture in the other end.

When such a shock-absorber is mounted for use with a car, the cylinder and the stem are fixed on the wheel or axle and on the car frame, respectively, so that the shock-absorber damps the oscillations of the springing.

The fixing of the stem does not present special difficulties, since its free end can be screw-cut or machined so as to be able to be fitted with any suitable fixing member.

On the other hand, the cylinder fixing is more critical and the cylinder is generally fixed by welding. However, this method presents the drawback of not giving absolute safety, which is serious in the springings where the shock-absorber functions also as a strut supporting the car frame on the wheel or the axle.

The invention has for its purpose to eliminate this drawback, and to ensure more reliability. In some embodiments, it is also possible to simplify the mounting and removal operations.

STATEMENT OF THE INVENTION

According to the invention, the shock-absorber cylinder is connected to an iron member such as a ferrule which may be disposed around the cylinder, any sliding of that member being precluded by nesting in apertures provided in the iron member, mating with projections formed on the shock-absorber cylinder, of a shape corresponding to that of the apertures.

The iron member is formed with an extension, which is arranged to be made easily unitary with that portion of each of the set of wheels receiving the absorber, for example the member comprising the spindle of a wheel, or the stub axle.

Various other objects, features and attendant advantages of the present invention will be more fully appreciated as the same become better understood from the following detailed description of the present invention when considered in connection with the accompanying drawing.

BRIEF DESCRIPTION OF THE DRAWINGS

FIG. 1 is a schematic side elevation view of a fixing device according to the invention, applied to one of the front wheels of a car;

FIG. 2 is a partial view on a larger scale showing an axial cross section, parallel to the plane of FIG. 1, of the lower end of the absorber with the connected ferrule;

FIG. 3 is a section on the line III—III in FIG. 2; and

FIG. 4 is a section on the line IV—IV of FIG. 3.

DESCRIPTION OF THE PREFERRED EMBODIMENT

Referring now to FIG. 1, there is shown in FIG. 1 the outer tube or cylinder of a telescopic hydraulic shock-absorber, forming part of a Mac Pherson type springing having a compression spring 2.

The spring compression force is applied on one end, against a flange 3 fixed on the absorber tube 1, and, on the other end, against an abutment 4, unitary with the car frame, and on which is fixed, for example by a nut, one end of stem 5, the other end of which is connected to a working piston 6 of the shock-absorber (FIG. 6).

At its lower end, the tube 1 should be unitary with a spindle of a wheel (embodiment of FIG. 1) or with an axle, and it is here that is applied the device of the invention, which will be described hereinafter.

The absorber is of the two-tubes type, i.e. it comprises two concentric tubes: an outer tube 1 and an inner tube 7 (shown in part on FIG. 2), tube 7 being that in which is slidably received piston 6, as fixed to one end of stem 5. Between tube 1 and 7 there is provided an annular space which is in communication with the inside of tube 7 through a valve assembly 8. The lower part 9 of this annular space is filled up to level 10 with an absorber liquid, and above level 10, in the upper part 11 of the annular space, there is air or a similar compressible fluid, so that the transfer of liquid between space 9 and inner of tube 7 through the valve 8 allows for the compensation of volume variation of stem 5, inside the absorber.

In the embodiment of the invention which is shown on the drawings, the outer tube has been formed, during its manufacture, with two projections or embossings 12, diametrically opposed, which can have a relatively reduced height, equal to the thickness of tube 1 (FIG. 3).

These projections can be manufactured on the following manner. A suitable tool, e.g. with two expanding sectors, mechanically or hydraulically operated, can be introduced in the tube.

An iron ferrule comprising two members 13,14 is surrounding the lower part of tube 1.

As it is shown on FIG. 4, a first member 13 comprises a semi-collar 13a, applied along the tube, and two flanges or extensions 13b, substantially parallel to each other. This member 13 is formed with two apertures 13c, the shape of which is corresponding to that of projections 12 provided on tube 1 (rectangular in the present embodiment), so that for the mounting of member 13 on the absorber tube, what is made by resiliently spreading aside flanges 13a, the projections 12 can be nested in the apertures 13c.

The second member 14, which is disposed between flanges 13b of member 13, comprise a curved portion fitted to the outer surface of tube 1 and two flanges 14a engaging the inner faces of flanges 13b. Apertures 15, provided for in flanges 13b and 14a allow to fix one to the other, the members 13 and 14, and simultaneously for tightening these members around tube 1.

It results because of the foregoing that tube 1 of the shock-absorber is rigidly connected to the iron ferrule formed by members 13 and 14, without being able to rotate inside this ferrule, nor to slide longitudinally due to the penetration of projections 12 in apertures 13c, and after the tightening of members 13 and 14, precluding the projections to escape from the apertures.

Flanges 13b and 14a of the two members of the ferrule are adapted to be fixed on the corresponding part of the vehicle.

It can be seen in FIG. 1 that apertures 16 formed in flanges 13b and 14a allow to fix the ferrule by means of bolts and nuts on a part 17 supporting the stub axle 18 of a front wheel 19.

The axle supporting part 17 is formed with a special shape according to the invention. This part is formed with two tabs or legs 17a and 17b adapted to be imbedded between flanges 14, and fitted with apertures in register with apertures 16 of the flanges, for the fixing bolts.

It will be apparent that the size of the ferrule, when considered parallel to the tube 1 axis, can be of a length great enough for having a distance between apertures 16, and a spacing between the ends of legs 17a and 17b of axle supporting part 17, sufficient for a suitable transfer of forces from the absorber tube to the axle supporting part. Also, it is apparent that the invention provides a number of technical advantages.

While the invention has been disclosed with reference to one preferred embodiment, it is understood that many modifications and changes will become apparent to those ordinary skilled in the art. For example, tubular ferrule 13, with apertures 13c could be radially rigid instead of being spreadable, as above described. Outer tube 1 is then introduced in the ferrule during the manufacture of the shock-absorber, whilst said tube has still a smooth surface, and the projections 12 are formed in register with the apertures 13c after the tube is inserted in the ferrule.

It would be possible to insert the tube with its projections in the ferrule when this last is heated enough to be expanded, in the same way as a wheel band, the projections being settled in the apertures during the cooling of the ferrule.

The invention is in no way limited to the case of a compression spring surrounding the absorber. The invention can be used with any spring, placed in any suitable position. And the present invention is intended to cover all such obvious modifications and changes which fall within the spirit and scope of the invention, as defined in the appended claims.

I claim:

1. For a vehicle a suspension of the kind comprising a telescopic hydraulic shock absorber arranged between the vehicle frame and the individual wheels, said shock-absorber having two concentric tubes of which the inner tube is the working chamber with reciprocating piston, while the outer tube forms the casing of the absorber, said shock-absorber being associated with a ferrule having the form of a semi-collar clamped on said outer tube, said ferrule being provided with means for securing it to the axle of a wheel, means for securely affixing said ferrule to the exterior of said outer tube for preventing rotation and slidable movement of said ferrule relative to said outer tube including the feature of said outer tube having at least an outer projection embossed therein, while the ferrule is provided with an aperture having the same shape as said projection and adapted to receive it when the ferrule is clamped on the said outer tube.

2. The arrangement of claim 1 wherein the outer tube of the shock-absorber has two outer projections embossed therein symetrically, while the ferrule, having the shape of a semi-collar with two extensions so as to straddle the outer tube, is provided with two apertures having the same shape as said projections and symetrically located so that the said projections are nested in the said apertures when the ferrule is straddling the outer tube.

* * * * *